(12) United States Patent
Prakah-Asante et al.

(10) Patent No.: US 11,126,871 B2
(45) Date of Patent: Sep. 21, 2021

(54) ADVANCED WARNINGS FOR DRIVERS OF VEHICLES FOR UPCOMING SIGNS

(71) Applicant: Ford Motor Company, Dearborn, MI (US)

(72) Inventors: Kwaku Prakah-Asante, Commerce Township, MI (US); Manoharprasad K. Rao, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 202 days.

(21) Appl. No.: 16/472,515

(22) PCT Filed: Dec. 21, 2016

(86) PCT No.: PCT/US2016/068139
§ 371 (c)(1),
(2) Date: Jun. 21, 2019

(87) PCT Pub. No.: WO2018/118057
PCT Pub. Date: Jun. 28, 2018

(65) Prior Publication Data
US 2019/0325238 A1 Oct. 24, 2019

(51) Int. Cl.
*G06K 9/00* (2006.01)
*B60W 40/08* (2012.01)
*B60W 50/14* (2020.01)
*G01C 21/36* (2006.01)
*G05D 1/02* (2020.01)

(52) U.S. Cl.
CPC ......... *G06K 9/00818* (2013.01); *B60W 40/08* (2013.01); *B60W 50/14* (2013.01); *G01C 21/3641* (2013.01); *G01C 21/3655* (2013.01); *G05D 1/0251* (2013.01); *B60W 2050/143* (2013.01)

(58) Field of Classification Search
USPC .............................................. 701/28; 708/28
See application file for complete search history.

(56) References Cited

U.S. PATENT DOCUMENTS

2005/0083211 A1\* 4/2005 Shafir ................ G01C 21/3697
340/905
2014/0195143 A1\* 7/2014 Kandangath ....... G01C 21/3629
701/400
2018/0151065 A1\* 5/2018 Liu ...................... G08G 1/0129

FOREIGN PATENT DOCUMENTS

GB      2528084     \* 8/2014
WO   WO2016112353  \* 1/2016

\* cited by examiner

*Primary Examiner* — Omar Casillashernandez
(74) *Attorney, Agent, or Firm* — Brandon Hicks; Eversheds Sutherland (US) LLP

(57) ABSTRACT

Method and apparatus are disclosed for advanced warnings to drivers of vehicles for upcoming signs. An example vehicle includes a GPS receiver to determine a vehicle location. The example vehicle also includes a condition identifier to determine a familiarity level of a driver for the vehicle location and detect an upcoming sign. The example vehicle also includes a warning determiner to compare the familiarity level to a threshold level and provide, in response to the familiarity level being less than the threshold level, an advanced warning to the driver for the upcoming sign.

18 Claims, 5 Drawing Sheets

ADVANCED WARNINGS FOR DRIVERS OF VEHICLES FOR UPCOMING SIGNS

TECHNICAL FIELD

The present disclosure generally relates to vehicle warnings and, more specifically, advanced warnings to drivers of vehicles for upcoming signs.

BACKGROUND

Oftentimes, signs are positioned adjacent to roads to provide information to drivers and/or passengers of vehicles. Typical signs adjacent to the road include billboards, specific service signs, and/or road or traffic signs. Oftentimes, a sign is positioned along a side of a road, overhangs a road, and/or is located at an intersection between two or more roads. To obtain information from the sign, a driver of a vehicle looks at and/or views the sign while driving the vehicle along the road.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for advanced warnings to drivers of vehicles for upcoming signs. An example disclosed vehicle includes a GPS receiver to determine a vehicle location. The example disclosed vehicle also includes a condition identifier to determine a familiarity level of a driver for the vehicle location and detect an upcoming sign. The example disclosed vehicle also includes a warning determiner to compare the familiarity level to a threshold level and provide, in response to the familiarity level being less than the threshold level, an advanced warning to the driver for the upcoming sign.

An example disclosed method for alerting a driver to an upcoming sign includes obtaining, via a GPS receiver, a vehicle location and determining, via a processor, a familiarity level of a driver for the vehicle location. The example disclosed method also includes detecting an upcoming sign and providing, in response to the familiarity level being less than the threshold level, an advanced warning for the upcoming sign to the driver.

An example disclosed tangible computer storage medium includes instructions which, when executed, cause a machine to obtain, via a GPS receiver, a vehicle location of a vehicle and determine, via a processor, a familiarity level of a driver for the vehicle location. The instructions which, when executed, also cause the machine to detect an upcoming sign and provide, in response to the familiarity level being less than the threshold level, an advanced warning for the upcoming sign to the driver.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
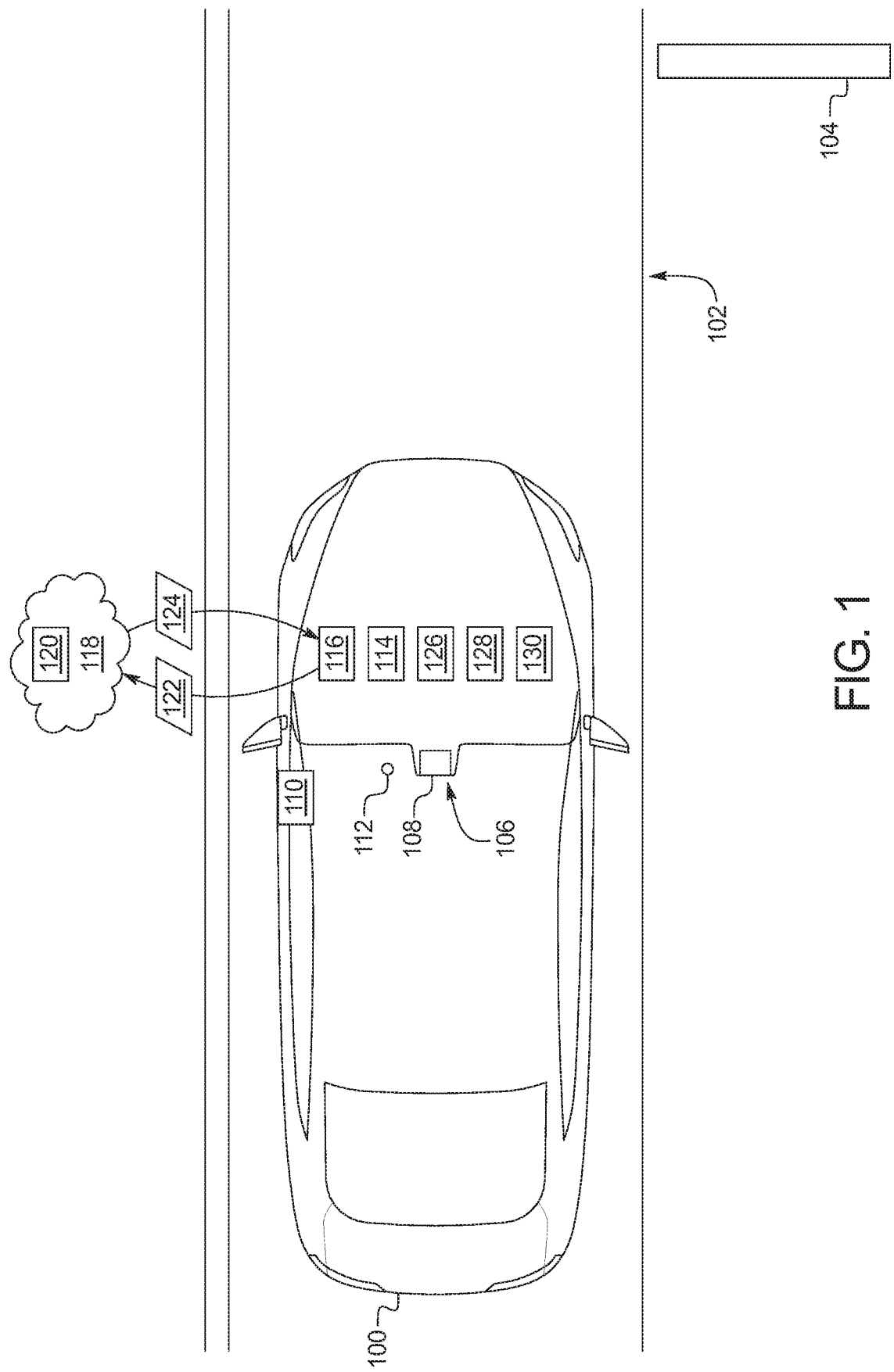
FIG. 1 illustrates an example vehicle approaching an upcoming sign in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, signs are positioned adjacent to roads to provide information to drivers and/or passengers of vehicles. In some instances, the sign adjacent to the road is a billboard (e.g., an advertisement), a specific service sign (e.g., identifying gas station(s), hotel(s), and/or restaurant(s) near an exit ramp), and/or a road or traffic sign (e.g., a regulatory sign, a warning sign, a work zone sign, a school sign, a guide sign such as a street name sign and/or an exit ramp sign, etc.). Signs may be positioned along a side of a road (e.g., a roadside), overhang a road, and/or be located at an intersection between two or more roads.

To obtain instructions and/or other information from a sign, a driver of a vehicle looks at and/or views the sign while driving the vehicle along the road. For example, the driver of the vehicle may look at a street sign to identify an intersecting road. In some instances, the driver may not see the sign and/or may see the sign at the last moment before passing the sign. For example, a driver unfamiliar with an area may be hesitant to look away from the road and toward approaching signs to be able to obtain information from the approaching signs. As a result, the driver potentially may miss instructions and/or other information of interest as the vehicle travels along the road (e.g., identification of a street on which a driver intends to turn, directions for a detour, identification of nearby services, etc.).

Example methods, apparatus, and computer readable media disclosed herein provide a driver of a vehicle with an advanced warning for an upcoming sign to enable the driver to obtain information from the sign. The advanced warning is provided to the driver before the vehicle reaches the upcoming sign (e.g., a street sign) to enable the driver to obtain the information of the sign (e.g., a street name), make a decision based on the information of the sign (e.g., decide whether to turn onto the street), and safely perform a driving maneuver associated with the information of the sign (e.g., turn onto the street).

Examples disclosed herein for providing advanced warnings to drivers of vehicles for upcoming signs include a GPS receiver that determines a vehicle location of the vehicle, a condition identifier that determines a familiarity level of the driver for the vehicle location, and a warning determiner that compares the familiarity level to a threshold level. As used herein, a "familiarity level" refers to a measurement that quantifies a driver's familiarity with an area or region of travel. For example, the familiarity level may be a number, a fraction, a decimal, a percentage, etc.

In some examples, the condition identifier determines the familiarity level of the driver for the vehicle location by comparing the vehicle location to a driving cluster associated with the driver. The familiarity level increases as the distance between the driving location and the driving cluster decreases, and the familiarity level decreases as the distance between the driving location and the driving cluster increases. As used herein, a "cluster" or "driving cluster" refers to an area or region in and/or through which a driver frequently travels. For example, the condition identifier determines the driving cluster based on start locations and stop locations of previous trips of the driver.

Further, the condition identifier detects an upcoming sign that the vehicle is approaching, and the warning determiner provides an advanced warning to the driver for the upcoming sign in response to the familiarity level being less than the threshold level. As used herein, an "upcoming sign" refers to a sign that is being approached by a vehicle. For example, an upcoming sign may be a billboard (e.g., displaying an advertisement), a specific service sign (e.g., identifying gas stations, hotels, and/or restaurants near an exit of a highway), and/or a road or traffic sign (e.g., a regulatory sign, a warning sign, a guide sign such as a street name sign or an exit ramp sign, a work zone sign, a school sign, etc.) positioned alongside and/or overhanging a road on which the vehicle is traveling. As used herein, an "advanced warning" refers to an alarm, warning, and/or alert that is to notify a driver and/or other user of a sign (e.g., an upcoming sign) before the driver and/or other user reaches the sign. In some examples, the advanced warning includes a visual warning that is presented via a display of the vehicle. Additionally or alternatively, the advanced warning includes an vehicle location audio warning presented via one or more speakers of the vehicle.

In some examples, the warning determiner identifies sign instruction(s) associated with the upcoming sign and includes the sign instruction(s) in the advanced warning that is provided to the driver of the vehicle. As used herein, "sign instruction" refers to indicia of a sign (e.g., "slow down: construction ahead," "Exit 72, South Bend," etc.). The warning determiner may obtain, via a communication module of the vehicle, the sign instruction(s) from a navigation system. Additionally or alternatively, the vehicle may include a camera (e.g., a first camera, an exterior camera) that obtains image(s) of the upcoming sign to determine the sign instruction(s) of the upcoming sign.

In some examples, the warning determiner provides the advanced warning further based on a time-to-arrival of the vehicle at the upcoming sign so that the advanced warning is provided to the driver before the vehicle arrives at the sign. As used herein, "time-to-arrival" refers to a duration of time until a vehicle arrives at and/or passes a sign. The condition identifier may determine the time-to-arrival based on the vehicle location, a sign location of the upcoming sign (e.g., received via the navigation system and/or determined by the camera of the vehicle), a velocity of the vehicle relative to the upcoming sign, and/or an acceleration of the vehicle.

Additionally or alternatively, the warning determiner provides the advanced warning to the driver for the upcoming sign further based on weather conditions and/or a driver type of the driver and/or weather conditions. For example, the vehicle includes a weather sensor that detects weather conditions (e.g., rainy, snowy, icy, sunny, cloudy, foggy, etc.) of the vehicle location of the vehicle. Further, the vehicle may include a camera (e.g., a second camera, an interior camera) that obtains image(s) of the driver to determine the driver type of the driver and/or may include input device(s) (e.g., buttons, a touch screen, a speech recognition system, etc.) that enables the driver to select the corresponding driver type.

As used herein, a "driver type" refers to a characteristic of a driver that is associated with driving a vehicle. The driver type may be based on experience, age, or driver history. Driver types based on experience may be based on a time period or an amount of time of driving experience. For example, driver types based on experience include a novice (e.g., less than 3 years and/or less than 1,000 hours of driving experience), a proficient (e.g., 3-10 years and/or 1,000-10,000 hours of driving experience), and a veteran (e.g., more than 10 years and/or more than 10,000 hours of driving experience). Driver types based on age may include a teenager (e.g., 19 years old or younger), an adult (e.g., 20-64 years old), and a senior (e.g., 65 years old or older). Driver types based on history may include a flagged driver (e.g., a driver with at least a predetermined number of driving violations (e.g., tickets, accidents) in a predetermined period of time) and a non-flagged driver (e.g., a driver with less than a predetermined number of driving violations in a predetermined period of time).

Turning to the figures, FIG. 1 illustrates an example vehicle 100 in accordance with the teachings herein. In the illustrated example, the vehicle 100 is traveling along a road 102 and approaching an upcoming sign 104 that is positioned ahead of the vehicle 100 along the road 102. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

The vehicle 100 of the illustrated example includes an infotainment head unit 106. The infotainment head unit 106 provides an interface between the vehicle 100 and a user. The infotainment head unit 106 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 106 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 106 displays the infotainment system on, for example, the center console display.

As illustrated in FIG. 1, the infotainment head unit 106 includes a display 108 and a speaker 110. The display 108 presents an interface to present information to the driver. For example, the display 108 may present a visual warning for the upcoming sign 104 to a driver of the vehicle 100. In some examples, the display 108 is a touch screen that enables the driver and/or a passenger of the vehicle 100 to provide input information to a system of the vehicle 100 via the display 108. For example, the touch screen presents button(s) and/or other input device(s) to the driver to enable the driver to select a driver type and/or provide a driver identification of the driver. In other examples, other portions of the infotainment head unit 106 may include the input device(s) (e.g., analog button(s)) to enable the driver to select the driver type and/or provide the driver identification of the driver. Further, the speaker 110 of the infotainment head unit 106 emits audio signals for the driver and/or passenger(s) of the vehicle 100. In some examples, the speaker 110 emits an audio warning for the upcoming sign 104 to the driver of the vehicle 100.

The vehicle 100 of the illustrated example also includes a camera 112 and a global positioning (GPS) receiver 114. The camera 112 is positioned within an interior of the vehicle 100 to monitor the driver of the vehicle 100. For example, the camera 112 obtains image(s) of the driver to determine the driver type and/or the driver identification of the driver. Further, the GPS receiver 114 receives a location of the vehicle 100. For example, the GPS receiver 114 determines the location of the vehicle 100 relative to the upcoming sign 104.

As illustrated in FIG. 1, the vehicle 100 includes a communication module 116 that is communicatively coupled to a network 118 (e.g., the Internet) to communicate with a navigation system 120 via the network 118. For example, the navigation system 120 includes maps which may be presented to the driver via the display 108, provides directions to the driver based on the location of the vehicle 100 and a target location. Further, the navigation system 120 includes information regarding nearby signs (e.g., the upcoming sign 104). In the illustrated example, the communication module 116 sends vehicle location data 122 that includes a current location of the vehicle 100 (e.g., received by the GPS receiver 114). Based on the vehicle location data 122 of the vehicle 100, the navigation system 120 identifies signs near the vehicle (e.g., the upcoming sign 104) and provides corresponding sign data 124 to the vehicle 100. For example, the sign data 124 includes sign location data (e.g., sign location data 210 of FIG. 2) of the upcoming sign 104 and sign information (e.g. sign information 216 of FIG. 2) that includes sign instructions of the upcoming sign 104. In the illustrated example, the navigation system 120 is external to the vehicle 100. In other examples, the navigation system 120 is on board the vehicle 100.

In the illustrated example, the vehicle 100 also includes a camera 126 that collects images of the upcoming sign 104 as the vehicle approaches the upcoming sign 104. The camera 126, in addition or as an alternative to the GPS receiver 114, is utilized to collect the sign data 124 of the upcoming sign. For example, the camera 126 is utilized to determine the sign location of the upcoming sign 104 relative to the vehicle location.

Further, as illustrated in FIG. 1, the vehicle 100 includes a condition identifier 128 and a warning determiner 130. In the illustrated example, the condition identifier 128 identifies and/or determines one or more condition(s) and/or characteristic(s) associated with the vehicle 100 and/or the driver of the vehicle 100 (a familiarity level of the driver with the current location, a driver type, weather conditions, a time-to-arrival of the vehicle 100 for the upcoming sign 104, a velocity and/or acceleration of the vehicle 100, a distance to the upcoming sign 104, etc.). The warning determiner 130 determines whether to provide an advanced warning to the driver for the upcoming sign 104 based on the condition(s) and/or characteristic(s) identified by the condition identifier 128.

Figure 2:
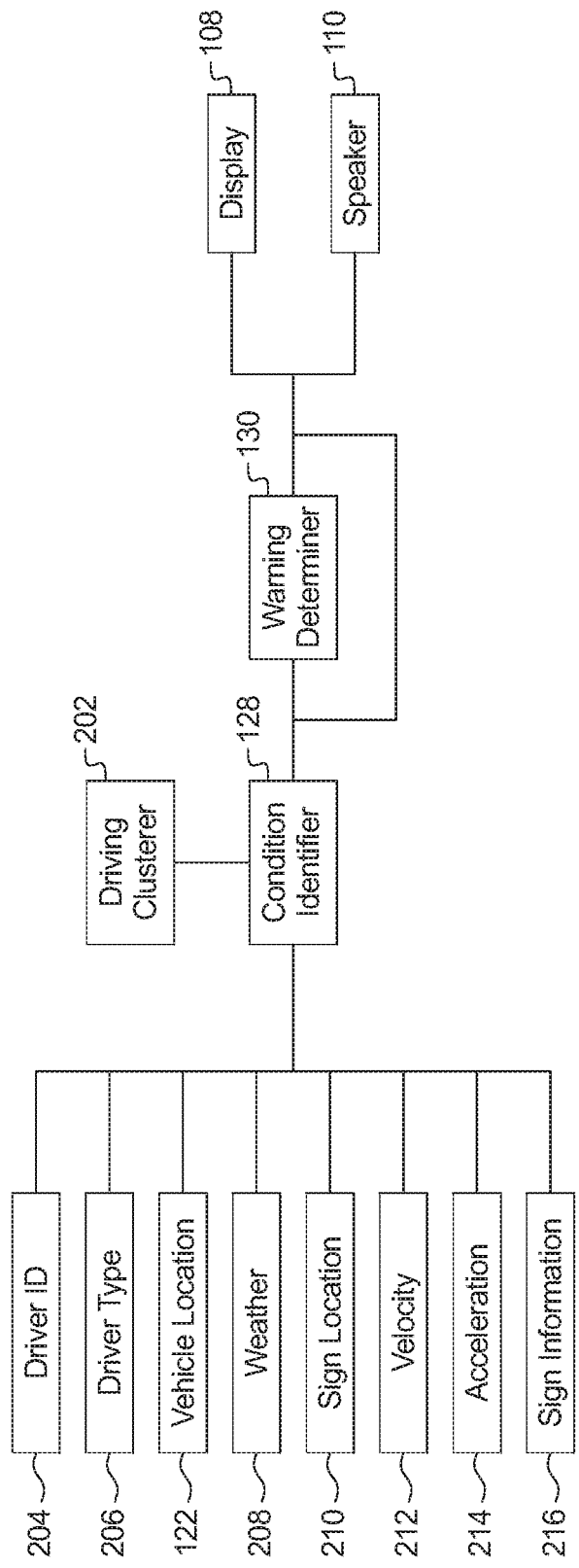
FIG. 2 is a block diagram of a condition identifier, a warning determiner, and a driving clusterer of the vehicle of FIG. 1.

FIG. 2 is a block diagram of the condition identifier 128, the warning determiner 130, and a driving clusterer 202 that determines driving clusters associated with the vehicle 100 and/or the driver of the vehicle 100.

As illustrated in FIG. 2, the condition identifier 128 collects and/or receives driver identification data 204, driver type data 206, the vehicle location data 122, weather condition data 208, sign location data 210, vehicle velocity data 212, vehicle acceleration data 214, and sign information 216. The driver identification data 204 includes identification information of a driver collected, for example, via an input device of the infotainment head unit 106 and/or the camera 112 that enables the driving clusterer 202 to associate detected driving maneuvers of the vehicle 100 to a particular driver of the vehicle 100. The vehicle location data 122 includes past and/or current locations of the vehicle 100 that is collected via the GPS receiver 114.

Further, the driving clusterer 202 collects the vehicle location data 122 and/or the driver identification data 204 via the condition identifier 128. The driving clusterer 202 utilizes the vehicle location data 122 and/or the driver identification data 204 to determine one or more driving clusters associated with the vehicle 100 and/or the driver of the vehicle 100. For example, to determine a driving cluster, the driving clusterer 202 identifies data associated with previous trips within the vehicle location data 122. For example, the driving clusterer 202 identifies a start location and a corresponding stop location for each previous trip identified in the vehicle location data 122. Based on the start locations and the stop locations of the previous trips, the driving clusterer 202 determines at least one driving cluster associated with the vehicle 100 and/or the driver in which the vehicle 100 and/or the driver frequently travels. For each of the driving clusters, the driving clusterer 202 also identifies a corresponding center point and a corresponding outer perimeter of the driving cluster. For example, one or more of the driving clusters identified by the driving clusterer 202 may be a circle for which the corresponding outer perimeter is defined by a diameter of the circle. In some examples, the driving clusterer 202 utilizes a clustering algorithm (e.g., a k-means clustering algorithm) and/or any other algorithm to identify the cluster(s), the corresponding center(s), and/or the corresponding outer perimeter(s).

Based on the driving clusters and the vehicle location data 122, the condition identifier 128 determines a familiarity level of the driver for the current location of the vehicle 100. The familiarity level may be a number, a fraction, a decimal, a percentage, etc. For example, the familiarity level increases the closer the vehicle 100 is from the driving cluster(s) and decreases the farther the vehicle 100 is to the driver cluster(s). That is, the familiarity level increases the closer the vehicle 100 is to a familiar area and decreases the farther the vehicle is from a familiar area. Further, the warning determiner 130 compares the familiarity level to a predetermined threshold level to determine whether to present an advanced warning to the driver of the vehicle 100. For example, the warning determiner 130 presents the advanced warning in response to determining that the familiarity level is less than the threshold level.

The warning determiner 130 also may determine whether to present the advanced warning based on other factors (e.g., driver type, weather conditions, time-to-arrival, etc.). In some examples, the condition identifier 128 determines a driver type of the driver, and the warning determiner 130 determines whether to provide the advanced warning based on the driver type. The condition identifier 128 determines the driver type utilizing the driver type data 206 that is collected, for example, via an input device of the infotainment head unit 106 and/or the camera 112. In some examples, the condition identifier 128 determines weather conditions of the current location of the vehicle 100, and the warning determiner 130 determines whether to provide the advanced warning based on the weather conditions.

The warning determiner 130 also may determine whether to present the advanced warning based on a time-to-arrival of the vehicle 100 at the upcoming sign 104. For example, the warning determiner 130 presents the advanced warning in response to determining that the time-to-arrival is less than or equal to a predetermined threshold time period to avoid creating too great a time period between the driver receiving the advanced warning and the driver observing the upcoming sign 104. The condition identifier 128 determines the time-to-arrival based on the current location of the vehicle 100, a location of the upcoming sign 104, a velocity of the vehicle 100 relative to the upcoming sign 104, and/or an acceleration of the vehicle 100. In such examples, the condition identifier 128 determines past and/or current velocity value(s) of the vehicle 100 utilizing the vehicle velocity data 212 and determines past and/or current acceleration value(s) of the vehicle 100 utilizing the vehicle acceleration data 214. The condition identifier 128 determines the current location of the vehicle 100 via the GPS receiver 114 and a location of the upcoming sign 104 from the sign location data 210. For example, the sign location data 210 is included in the sign data 124 that is collected by the camera 126 and/or by the communication module 116 from the navigation system 120 via the network 118.

Additionally or alternatively, the warning determiner 130 may determine whether to present the advanced warning based on driving maneuvers identified via the vehicle velocity data 212 and the vehicle acceleration data 214. For example, if the driver observes the upcoming sign 104 and begins to slow down, the warning determiner 130 may identify that the driver of the vehicle 100 has observed the upcoming sign 104 and subsequently determine not to present the advanced warning to the driver.

In some examples, the condition identifier 128 determines an advanced warning score. For example, the advanced warning score is initially set at '0' and increases by a predetermined value (e.g., by a value of T) for each characteristic associated with providing an advanced warning to the driver. For example, the condition identifier 128 may increase the advanced warning score by a value of '1' if the familiarity level is less than the threshold level and may keep the advanced warning score unchanged if the familiarity level is greater than or equal to the threshold level. The condition identifier 128 also may increase the advanced warning score by a value of '1' for unfavorable weather conditions (e.g., nighttime, rainy, snowy, icy, foggy, etc.) and may keep the advanced warning score unchanged for favorable or neutral weather conditions (e.g., daytime, sunny, cloudy, etc.). In some examples, the condition identifier 128 may increase the advanced warning score by a value of T for unfavorable driver types (e.g., a novice, a teenager, a senior, a flagged driver, etc.) and may keep the advanced warning score unchanged for favorable or neutral driver types (e.g., a proficient, a veteran, an adult, a non-flagged driver, etc.). Additionally or alternatively, the condition identifier 128 may increase the advanced warning score by a value of '1' if the vehicle velocity is great and/or the time-to-arrival is small and may keep the advanced warning score unchanged if the vehicle velocity is small and/or the time-to-arrival is great. In such examples, the warning determiner 130 determines whether to present the advanced warning based on the advanced warning score. For example, the warning determiner 130 presents the advanced warning in response to determining that the advanced threshold score is greater than or equal to a threshold score (e.g., a predetermined threshold score such as a threshold score of '3'). Further, the warning determiner 130 does not present the advanced warning in response to determining that the advanced threshold score is less than the threshold score.

As illustrated in FIG. 2, the warning determiner 130 presents the advanced warning via the display 108 and/or the speaker 110 of the infotainment head unit 106. For example, the warning determiner 130 presents a visual warning via the display 108 and/or emits an audio warning via the speaker 110. In other examples, the warning determiner 130 may present the advanced warning via any other device of the vehicle and/or the driver (e.g., a mobile device, a smart watch, etc.) that alerts the driver to the upcoming sign 104.

In some examples, the advanced warning presented by the warning determiner 130 includes at least a portion of the instruction(s) associated with the upcoming sign 104 from the sign information 216. For example, the sign information 216 includes sign instructions of signs near the vehicle 100 (e.g., the upcoming sign 104 and is included in the sign data 124 that is received by the communication module 116 of the vehicle 100 from the navigation system 120 via the network 118. Further, the warning determiner 130 determines when to provide the advanced warning to the driver. For example, the warning determiner 130 provides the advanced warning to the driver with enough time before the vehicle 100 reaches the upcoming sign 104 to enable the driver to obtain the sign instruction (e.g., a street name) of the upcoming sign 104, make a decision based on the sign instruction of the upcoming sign 104 (e.g., decide whether to turn onto the street), and safely perform a driving maneuver associated with the sign instruction (e.g., turn onto the street). In some examples, the warning determiner 130 determines when to provide the advanced warning based on the vehicle location, the location of the upcoming sign 104, the velocity of the vehicle 100 relative to the upcoming sign 104, and/or the acceleration of the vehicle 100.

Figure 3:
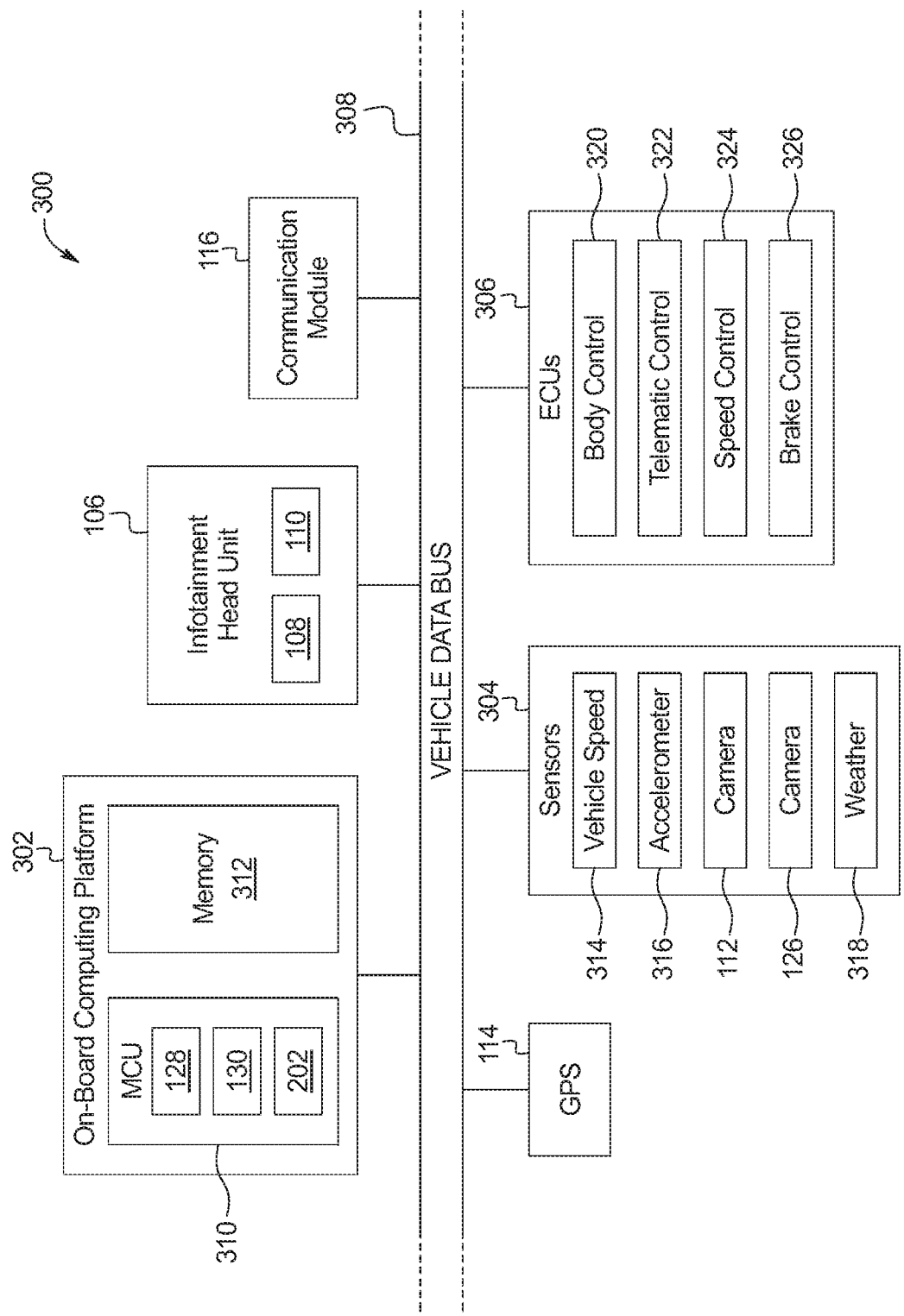
FIG. 3 is a block diagram of electronic components of the vehicle of FIG. 1.

FIG. 3 is a block diagram of electronic components 300 of the vehicle 100. As illustrated in FIG. 3, the electronic components 300 include an on-board computing platform 302, the infotainment head unit 106, the GPS receiver 114, the communication module 116, sensors 304, electronic control units (ECUs) 306, and a vehicle data bus 308.

The on-board computing platform 302 includes a microcontroller unit, controller or processor 310 and memory 312. In some examples, the processor 310 of the on-board computing platform 302 is structured to include the condition identifier 128, the warning determiner 130, and/or the driving clusterer 202. Alternatively, in some examples, the condition identifier 128, the warning determiner 130, and/or the driving clusterer 202 are incorporated into another electronic control unit (ECU) with its own processor 310 and memory 312. In other examples, the condition identifier 128, the warning determiner 130, and/or the driving clusterer 202 are incorporated into a mobile device (e.g., a smart phone, a smart watch, a tablet, etc.) that is in communication with the processor 310 of the vehicle 100, for example, via the communication module 116. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include a vehicle speed sensor 314, an accelerometer 316, the camera 112, the camera 126, and a weather sensor 318. For example, the vehicle speed sensor 314 monitors the vehicle speed and an acceleration and/or deceleration of the vehicle 100, the camera 112 identifies and/or monitors the driver of the vehicle 100, the camera 126 detects and monitors the upcoming sign 104, and the weather sensor 318 monitors weather conditions of the current location of the vehicle 100.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308.

In the illustrated example, the ECUs 306 include a body control module 320, a telematic control unit 322, a speed control unit 324, and a brake control module 326. For example, the body control module 320 controls one or more subsystems throughout the vehicle 100, such as power windows, power locks, an immobilizer system, power mirrors, etc. The body control module 320 may include circuits that drive one or more of relays (e.g., to control wiper fluid, etc.), brushed direct current (DC) motors (e.g., to control power seats, power locks, power windows, wipers, etc.), stepper motors, LEDs, etc. Further, the telematic control unit 322 controls tracking of the vehicle 100, for example, utilizing data received by the GPS receiver 114 of the vehicle 100. Additionally, the speed control unit 324 may autonomously control a speed at which the vehicle is traveling, and the brake control module 326 may autonomously operate brakes of the vehicle 100.

The vehicle data bus 308 communicatively couples the infotainment head unit 106, the GPS receiver 114, the communication module 116, the on-board computing platform 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
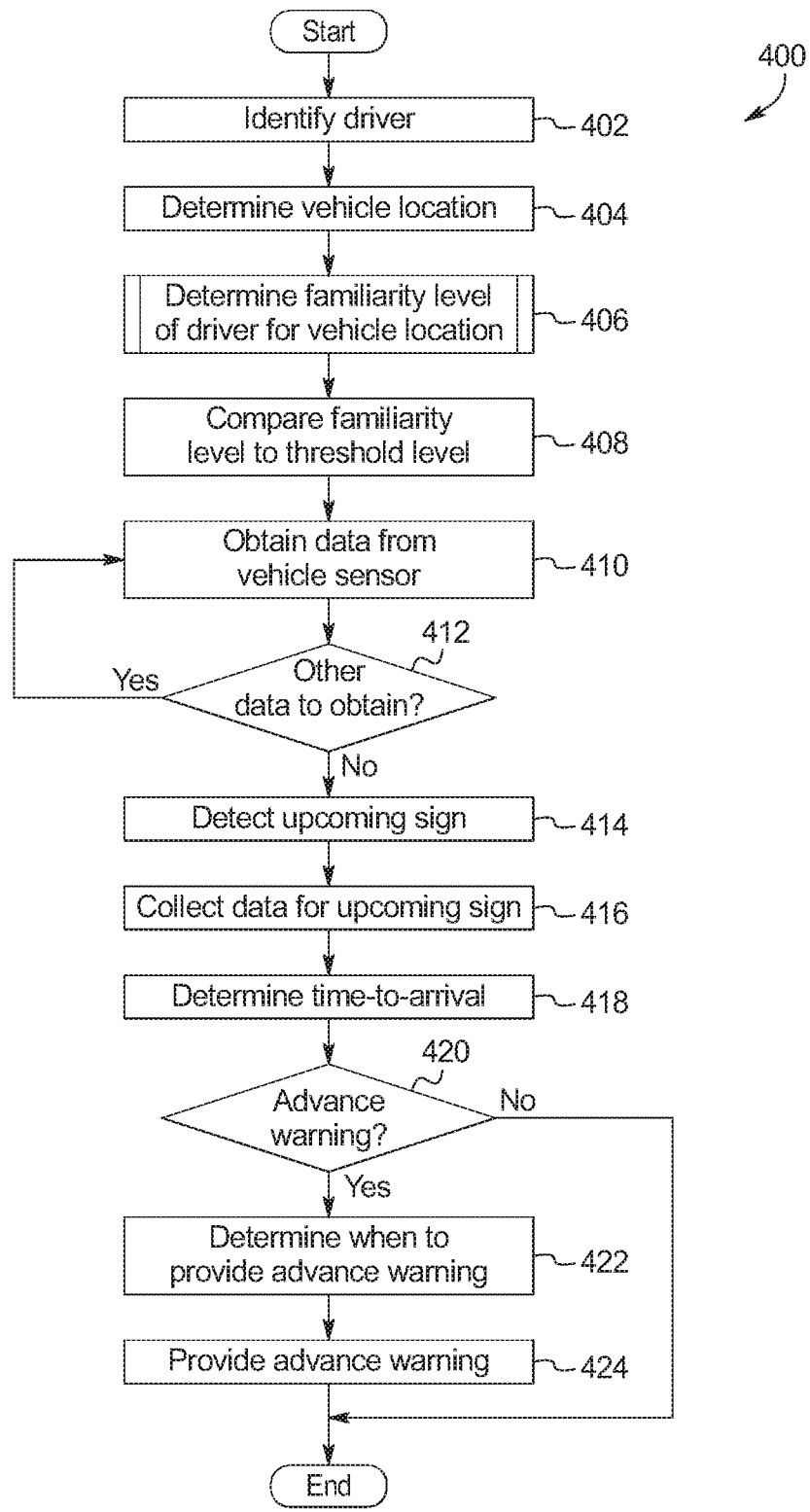
FIG. 4 is a flowchart of an example method to provide an advanced warning to a driver of the vehicle of FIG. 1 for an upcoming sign.

FIG. 4 is a flowchart of an example method 400 to provide an advanced warning to a driver of a vehicle for an upcoming sign. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example condition identifier 128 and/or the example warning determiner 130 of FIGS. 1-3. While the example program is described with reference to the flowchart illustrated in FIG. 4, many other methods of implementing the example condition identifier 128 and/or the example warning determiner 130 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the condition identifier 128 identifies the driver of the vehicle 100. For example, the condition identifier 128 identifies the driver from the driver identification data 204 that is collected via the camera 112 and/or an input device of the infotainment head unit 106. At block 404, the condition identifier 128 determines the location of the vehicle 100 via the GPS receiver 114. At block 406, the condition identifier 128 determines a familiarity level of the driver for the location of the vehicle 100. For example, the condition identifier 128 determines the familiarity level based on the location of the vehicle 100 and driving clusters corresponding to areas of travel that are familiar to the driver. At block 408, the warning determiner 130 compares the familiarity level to a threshold level of familiarity (e.g., a predetermined threshold level). For example, the warning determiner determines whether the familiarity level is less than, equal to, or greater than the threshold level.

At block 410, the condition identifier 128 obtains data from one of the sensors 304 of the vehicle 100. For example, the condition identifier 128 collects the driver type data 206 via the camera 112 of the vehicle 100. Further, at block 412, the condition identifier 128 determines whether there is other data to collect from the sensors 304 of the vehicle 100. If the condition identifier 128 determines that there is other data to obtain, the method 400 repeats blocks 410, 412 until the condition identifier 128 determines that there is no other data to obtain from the sensors 304. For example, the condition identifier 128 repeats blocks 410, 412 to collect the weather condition data 208, the vehicle velocity data 212, and the vehicle acceleration data 214.

Upon determining that there is no other data to collect from the sensors 304, the condition identifier 128 detects the upcoming sign 104 (block 414). For example, the condition identifier 128 detects the presence of the upcoming sign 104 via the camera 126 and/or via the navigation system 120. At block 416, the communication module 116 of the vehicle collects the sign data 124 (e.g., including the sign location data 210 and/or the sign information 216) associated with the upcoming sign 104 from the navigation system 120 via the network 118, and the condition identifier 128 receives the sign data 124 associated with the upcoming sign 104 from the communication module 116. In some examples, the communication module 116 sends the vehicle location data 122 to the navigation system 120 to enable the navigation system to identify the sign data 124 that corresponds to nearby signs that the vehicle 100 is approaching (e.g., the upcoming sign 104).

Further, at block 418, the condition identifier 128 determines a time-to-arrival of the vehicle 100 for the upcoming sign 104. For example, the condition identifier 128 determines the time-to-arrival based on the location of the vehicle 100, the location of the upcoming sign 104, the velocity of the vehicle 100 relative to the upcoming sign 104, and/or the acceleration of the vehicle 100.

At block 420, the warning determiner 130 determines whether to provide an upcoming warning to the driver for the upcoming sign 104. For example, the warning determiner 130 determines whether to provide the upcoming warning based on the comparison of the familiarity level to the threshold level, the driver type of the driver of the vehicle 100, the weather conditions of the location of the vehicle 100, the time-to-arrival of the vehicle 100 for the upcoming sign 104, the velocity of the vehicle 100 relative to the upcoming sign 104, the acceleration of the vehicle, the location of the vehicle 100, the location of the upcoming sign 104, a distance between the vehicle 100 and the upcoming sign 104, etc. In some examples, the warning determiner 130 determines whether to provide the advanced warning by determining an advanced warning score and comparing the advanced warning score to a threshold score (e.g., a predetermined threshold score. In such examples, the warning determiner 130 determines to provide the advanced warning if the advanced warning score is greater than or equal to the threshold score.

In response to the warning determiner 130 determining that the advanced warning is not to be presented to the driver of the vehicle 100, the method 400 ends. In response to the warning determiner 130 determining that the advanced warning is to be presented to the driver of the vehicle 100, the method 400 proceeds to block 422 at which the warning determiner 130 determines when the advanced warning is to be presented to the driver. For example, the warning determiner 130 determines to provide the advanced warning to the driver at a time before the vehicle 100 reaches and/or passes the upcoming sign (e.g., before the time-to-arrival) to enable the driver to be alerted to the upcoming sign in advance. At block 424, the warning determiner 130 provides the advanced warning to the driver of the vehicle 100. For example, the warning determiner 130 provides an audio warning via the speaker 110 of the vehicle 100 and/or a visual warning via the display 108 of the vehicle 100.

Figure 5:
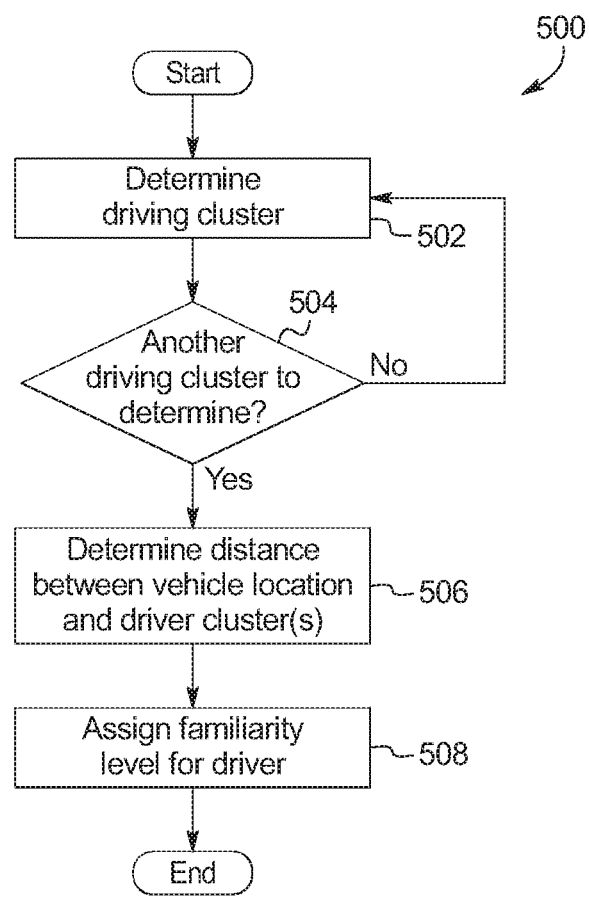
FIG. 5 is a flowchart of an example method for the condition identifier of FIG. 2 to determine a familiarity level of a driver for a location of the vehicle of FIG. 1.

FIG. 5 is a flowchart of an example method to implement block 406 of FIG. 4 for determining the familiarity level of the driver for the current location of the vehicle 100. The flowchart of FIG. 5 is representative of machine readable instructions that are stored in memory (such as the memory 312 of FIG. 3) and include one or more programs which, when executed by a processor (such as the processor 310 of FIG. 3), cause the vehicle 100 to implement the example condition identifier 128 of FIGS. 1-3 and/or the example driving clusterer 202 of FIGS. 2-3. While the example program is described with reference to the flowchart illustrated in FIG. 5, many other methods of implementing the example condition identifier 128 may alternatively be used. For example, the order of execution of the blocks may be rearranged, changed, eliminated, and/or combined to perform the method to implement block 406. Further, because the method to implement block 406 is disclosed in connection with the components of FIGS. 1-3, some functions of those components will not be described in detail below.

Initially, at block 502, the driving clusterer 202 determines a driver cluster associated with the vehicle 100 and/or the driver of the vehicle 100. For example, the driving clusterer 202 utilizes the vehicle location data 122 and/or the driver identification data 204 to determine the driving cluster. In such examples, the driving clusterer 202 identifies data (e.g., start and stop locations) associated with previous trips within the vehicle location data 122 to determine a driving cluster (e.g., including a respective center point and a respective outer perimeter) in which the vehicle 100 and/or the driver frequently travels. In some examples, the driving clusterer 202 utilizes a clustering algorithm (e.g., a k-means clustering algorithm) and/or any other algorithm to identify the cluster(s), the corresponding center(s), and/or the corresponding outer perimeter(s).

At block 504, the driving clusterer 202 determines whether there is another driving cluster to determine. In response to determining that there is another driving cluster, blocks 502, 504 are repeated until no other driving cluster is identified. In response to the driving clusterer 202 determining that there is no other driving cluster, the method 500 proceeds to block 506.

At block 506, the condition identifier 128 identifies a distance between the vehicle location of the vehicle 100 and the driving cluster(s). For example, the condition identifier 128 identifies a distance between the vehicle location and a nearest of the driving cluster(s). At block 508, the condition identifier 128 determines a familiarity level (e.g., a number, a fraction, a decimal, a percentage, etc.) of the driver for the current location of the vehicle 100 based on the distance to the one or more driving cluster(s). The familiarity level may be a number, a fraction, a decimal, a percentage, etc. For example, the familiarity level decreases the farther the vehicle 100 is from the driving cluster(s) and increases the closer the vehicle 100 is to the driver cluster(s). Further, in some examples, the warning determiner 130 compares the familiarity level to a predetermined threshold level to determine whether to present an advanced warning to the driver of the vehicle 100. For example, the warning determiner 130 presents the advanced warning in response to determining that the familiarity level is less than the threshold level.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a GPS receiver to determine a vehicle location;
   a condition identifier to:
      determine a familiarity level of a driver for the vehicle location;
      detect an upcoming sign; and
      determines a time-to-arrival of the vehicle at the upcoming sign based on the vehicle location, a sign location of the upcoming sign, a velocity of the vehicle relative to the upcoming sign, and an acceleration of the vehicle;
   a warning determiner to:
      compare the familiarity level to a threshold level; and
      provide, in response to the familiarity level being less than the threshold level, an advanced warning to the driver for the upcoming sign based on the time-to-arrival; and
   a camera to determine the sign location of the upcoming sign relative to the vehicle location.

2. The vehicle of claim 1, wherein:
   the condition identifier determines a driver type of the driver; and
   the warning determiner provides the advanced warning for the upcoming sign further based on the driver type of the driver.

3. The vehicle of claim 2, further including a camera to determine the driver type of the driver.

4. The vehicle of claim 1, wherein, to determine the familiarity level of the driver for the vehicle location, the condition identifier compares the vehicle location to a driving cluster associated with the driver, the familiarity level increases as a distance between the vehicle location and the driving cluster decreases.

5. The vehicle of claim 4, wherein a driving clusterer determines the driving cluster based on start locations and stop locations of previous trips of the driver.

6. The vehicle of claim 1, wherein the warning determiner provides the advanced warning further based on a weather locations of the vehicle location.

7. A vehicle comprising:
   a GPS receiver to determine a vehicle location;
   a communication module communicatively coupled to a navigation system;
   a condition identifier to:
      determine a familiarity level of a driver for the vehicle location;
      detect an upcoming sign; and
      determine a time-to-arrival of the vehicle at the upcoming sign based on the vehicle location, a sign location of the upcoming sign, a velocity of the vehicle relative to the upcoming sign, and an acceleration of the vehicle
   a warning determiner to:
      receive the sign location of the upcoming sign from the navigation system;
      compare the familiarity level to a threshold level; and
      provide, in response to the familiarity level being less than the threshold level, an advanced warning to the driver for the upcoming sign based on the time-to-arrival.

8. The vehicle of claim 1, wherein:
   the warning determiner identifies a sign instruction associated with the upcoming sign; and
   the warning determiner includes the sign instruction in the advanced warning.

9. The vehicle of claim 1, further including a display and wherein the advanced warning includes a visual warning presented via the display.

10. The vehicle of claim 1, further including a speaker and wherein the advanced warning includes an audio warning emitted via the speaker.

11. A method comprising:
    obtaining, via a GPS receiver, a vehicle location;
    determining, via a processor, a familiarity level of a driver for the vehicle location;
    detecting an upcoming sign;
    obtaining a sign location and a sign instruction associated with the upcoming sign from a navigation system via a communication module;
    providing, in response to the familiarity level being less than a threshold level, an advanced warning for the upcoming sign to the driver;
    determining a time-to-arrival at the upcoming sign based on the vehicle location, the sign location of the upcoming sign, a vehicle velocity relative to the upcoming sign, and a vehicle acceleration; and
    providing the advanced warning further based on the time-to-arrival.

12. The method of claim 11, further including determining a driver type of the driver and providing the advanced warning further based on the driver type of the driver.

13. The method of claim 12, further including determining the driver type via a camera.

14. The method of claim 11, further including determining weather conditions of the vehicle location and providing the advanced warning further based on the weather conditions.

15. The method of claim 11, wherein determining the familiarity level of the driver for the vehicle location includes:
   determining a driving cluster based on start locations and stop locations of previous trips of the driver; and
   comparing the vehicle location to the driving cluster associated with the driver, the familiarity level increases as a distance between the vehicle location and the driving cluster decreases.

16. The method of claim 11, further including the sign instruction in the advanced warning.

17. The method of claim 11, wherein providing the advanced warning includes providing a visual warning via a display.

18. The method of claim 11, wherein providing the advance warning includes emitting an audio warning via a speaker.

* * * * *